June 11, 1929.   K. SCHMIDT   1,716,798
ARRANGEMENT FOR PREVENTION OF REVERSE CURRENT IN BATTERY CHARGERS
Filed Jan. 9, 1928
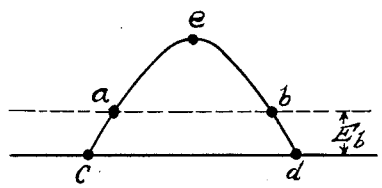
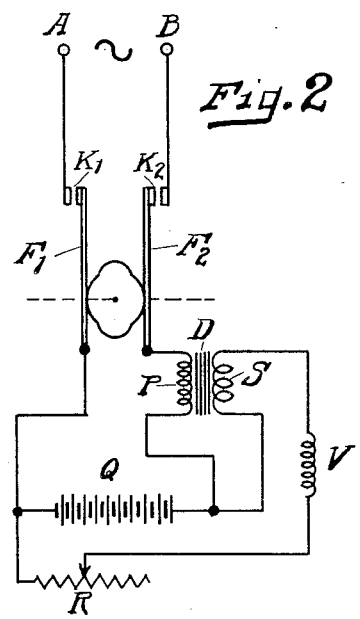
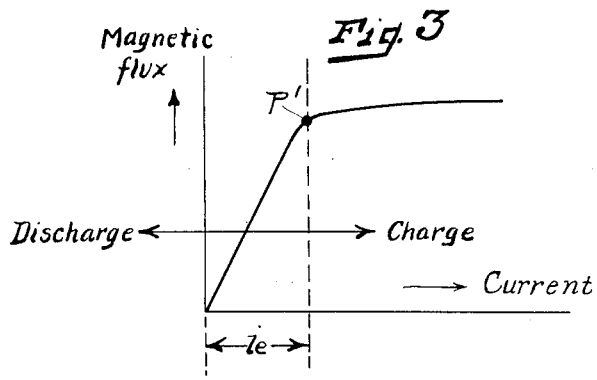
Inventor
Karl Schmidt
By Otto Ratz
Attorney Patented June 11, 1929.

1,716,798

UNITED STATES PATENT OFFICE.

KARL SCHMIDT, OF BERLIN-LICHTENRADE, GERMANY.

ARRANGEMENT FOR PREVENTION OF REVERSE CURRENT IN BATTERY CHARGERS.

Application filed January 9, 1928, Serial No. 245,612, and in Germany January 27, 1927.

My invention relates to an arrangement for prevention of reverse current in battery chargers.

It is well known that there are difficulties with all arrangements for converting alternating current into direct current when used for charging batteries. When alternating current is rectified into direct current the voltage is pulsating. If a gas rectifier is used, then this pulsating voltage may be used directly for charging batteries, because due to the valve action of the gas rectifier a reverse current is impossible.

It is different, however, with a mechanical rectifier, e. g., of the well-known pendulum type. Here a reversal of battery current may take place through the rectifier wherever the instantaneous value of the pulsating pressure is below the battery pressure. The result of this is an aggravated spark at the contact points and the difficulty, or even impossibility, of charging all batteries. This can be overcome in a way by adjusting the arrangement so that the circuit is opened at the instant when the pulsating pressure is equal to the battery pressure. All of these arrangements depend however on a definite pressure, and must therefore be changed, depending on the strength of current.

The invention is further illustrated in the accompanying drawings in which Figure 1 is a diagram illustrating the relation of the pulsating voltage and the battery voltage.

Figure 2 is an illustration of the manner in which this invention overcomes the difficulties of the reverse current, and Figure 3 is a diagrammatic representation of the saturating characteristics of the choke coil employed in this invention.

In Fig. 1 the curve $c\ a\ e\ b\ d$ represents a rectified alternating current wave corresponding to one-half period of the rectification by means of a mechanical rectifier as, for instance, the one illustrated in Fig. 2. Furthermore, $Eb$ is the battery pressure. It will be seen that at a point $c$ the pulsating pressure is zero, while the battery pressure is its full value. The result is that at point $c$ a maximum current from flow in the reverse direction through the rectifying apparatus and this will gradually decrease until point $a$ is reached. At point $a$ the battery pressure is equal to the pulsating pressure; the discharge or charge current is also zero. From point $a$ on the charging pressure is larger than the battery pressure and consequently an increasing charge will occur until point $e$, which will fall off to zero at point $b$. At this point a discharge of the battery will again take place until point $d$ is reached. Thus, in order to charge a battery the charging device must be so arranged that the charging connection is made at point $a$ and broken at point $b$.

Employing my invention, it will not be necessary to take account of the above procedure. The charging arrangement may be used with any pressure or current. The principle of the invention consists substantially in the fact that a choke is connected in the charging circuit which reduces as far as possible any variations in the pulsating current, and which reduces the reverse current from the battery through the rectifier to the lowest possible value. According to the invention, an iron core coil may be used saturated by means of direct current in such a way that the current flowing into the battery will meet with little impedance on account of the saturation, while the reverse current on account of demagnetization of the iron core will meet with high inductive impedance.

In Fig. 2 a suitable scheme of connection is illustrated, according to the invention. A and B are the supply terminals to which rectifying apparatus with contacts $K^1$ and $K^2$ are connected. The contacts work in such a way that only one half wave is allowed to go through, while at the other half wave the contacts are opened. This is done by means of a small cam driven synchronously with the alternating current to be rectified, by means of a small synchronous motor. This cam controls contact springs $F^1$ and $F^2$. In the charging circuit itself there is a choke coil D with saturated iron core, a primary winding P, and a battery Q to be charged. Parallel with the battery there may be supplied a direct current saturating winding S on the coil in connection with a choke coil V and a regulating resistance R. R serves to secure the proper saturation and V to prevent the passage of alternating current generated in the main choke coil into the battery.

Fig. 3 illustrates the well-known saturation curve of a choke coil according to the invention. This may be, for instance, brought to the point P by a constant magnetizing current $i_o$. At this point saturation begins in such a way that when the charging current passes through the choke coil it will have only small effect on account of its saturation, while with the reverse current from the battery which will therefore demagnetize the choke, a high inductive impedance will be caused and therefore a high choking effect, as can be seen from Fig. 3. This reverse current will therefore be so small that it can pass through the rectifying apparatus without any danger.

Having described my invention, what I believe to be new and desire to secure and protect by Letters Patent of the United States is:—

1. An arrangement for prevention of back currents in a battery charger, comprising a saturated choke coil with a separate magnetization means for arranging the choke coil so that the charging current will flow freely on account of the saturation, while a discharge current will meet with high impedance on account of demagnetization.

2. A battery charging device comprising a rectifying arrangement and means for prevention of reverse current, said means including a choke coil, a magnetizing winding on said choke coil, supply connections to said magnetizing winding, a current regulator connected to said magnetizing winding and a blocking coil in series with said magnetizing winding to protect the source of supply to said winding.

3. A battery charging device utilizing alternating current supply and comprising a mechanical rectifier, a choke coil, a core for the choke coil and a winding supplied by battery current to saturate said core, the direction of said winding being such that any current tending to flow from the battery toward the alternating current supply would oppose the saturation due to said winding.

4. A battery charging device utilizing alternating current supply and comprising a mechanical rectifier, a choke coil, a core for the choke coil and a winding supplied by battery current to saturate said core, the direction of said winding being such that any current tending to flow from the battery toward the alternating current supply would oppose the saturation due to said winding and means for regulating the current through said choke coil.

In testimony whereof I have affixed my signature.

KARL SCHMIDT.